US009043657B2

(12) United States Patent
Notohardjono et al.

(10) Patent No.: US 9,043,657 B2
(45) Date of Patent: *May 26, 2015

(54) PREVENTING DISTURBANCE INDUCED FAILURE IN A COMPUTER SYSTEM

(71) Applicant: International Business Machines Corporation, Armonk, NY (US)

(72) Inventors: Budy D Notohardjono, Poughkeepsie, NY (US); Arkadiy O. Tsfasman, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 13/689,836

(22) Filed: Nov. 30, 2012

(65) Prior Publication Data

US 2013/0138994 A1    May 30, 2013

Related U.S. Application Data

(63) Continuation of application No. 13/304,906, filed on Nov. 28, 2011.

(51) Int. Cl.
*G06F 11/00* (2006.01)
*G06F 11/07* (2006.01)
*G06F 1/20* (2006.01)

(52) U.S. Cl.
CPC ........ *G06F 11/0793* (2013.01); *G06F 11/0751* (2013.01); *G06F 1/20* (2013.01); *G06F 1/206* (2013.01)

(58) Field of Classification Search
CPC ............ G06F 11/0751; G06F 11/0754; G06F 11/079; G06F 11/0793; G06F 11/3003; G06F 11/3034; G06F 11/3058; G06F 11/2221; G06F 17/142; G06F 17/18

USPC ........................................................ 714/47.2
See application file for complete search history.

(56) References Cited

U.S. PATENT DOCUMENTS

| 4,862,298 A | 8/1989 | Genheimer et al. |
| 5,251,151 A | 10/1993 | Demjanenko et al. |

(Continued)

FOREIGN PATENT DOCUMENTS

KR        1020100083206 A        7/2010

OTHER PUBLICATIONS

Detection of Generalized-Roughness Bearing Fault by Special-Kurtosis Energy of Vibration or Current Signals by Fabio Immovilli, IEEE Transactions on Industrial Electronics, vol. 56, No. 11, Nov. 2009.

(Continued)

*Primary Examiner* — Michael Maskulinski
(74) *Attorney, Agent, or Firm* — Cantor Colburn LLP; Margaret McNamara

(57) ABSTRACT

A method to prevent failure on a server computer due to internally and/or externally induced shock and/or vibration. The method includes acquiring, by at least one sensor, analog acceleration data of components in a server computer. The data is then converted to digital format and stored within a motor drive assembly processor memory unit. The processor analyzes the stored data for existence of machine degradation. In response to detecting the existence of machine degradation, the motor drive assembly processor initiates remediation procedures. The remediation procedures include controlling rotating speed of moving devices or performing a complete system shut down.

9 Claims, 2 Drawing Sheets

(56) References Cited

U.S. PATENT DOCUMENTS

| | | | |
|---|---|---|---|
| 5,566,092 | A | 10/1996 | Wang et al. |
| 6,629,058 | B2 | 9/2003 | Komura et al. |
| 6,771,440 | B2 | 8/2004 | Smith |
| 7,099,782 | B2 | 8/2006 | Hitchcock et al. |
| 7,487,401 | B2 | 2/2009 | Urmanov et al. |
| 7,693,663 | B2 | 4/2010 | Friedlander et al. |
| 7,756,678 | B2 | 7/2010 | Bonissone et al. |
| 2008/0186194 | A1 | 8/2008 | Kaminski et al. |
| 2008/0189578 | A1 | 8/2008 | Raghuraman et al. |
| 2010/0030492 | A1 | 2/2010 | Kar et al. |
| 2010/0070210 | A1 | 3/2010 | Urmanov et al. |
| 2012/0019351 | A1 | 1/2012 | Bougaev et al. |

OTHER PUBLICATIONS

Vibration Monitoring of Rolling Element Bearings, Technical Note, 01db Metravib Technologies, www.01db.com, 2 pages.

Diagnosis of Mechanical Faults by Spectral Kurtosis Energy by Alberto Bellini et al, IEEE 2008, pp. 3079-3083.

Fault Diagnosis of Rolling Element Bearing Using Time-domain Features and Neural Networks by B. Sreejith et al, 2008 IEEE Region 10 Colloquium and the Third ICIIS, India, Dec. 8-10, Paper ID #409, pp. 1-6.

Detection of Generalized-Roughness Bearing Fault by Speical-Kurtosis Energy of Vibration or Current Signals by Fabio Immovilli, IEEE Transactions on Industrial Electronics, vol. 56, No. 11, Nov. 2009.

Diagnosis of Mechanical Faults by Spectral Kurtosis Energy by albedo Bellini et al., IEEE 2008, pp. 3079-3083.

Fault Diagnosis of Rolling Element Bearing Using Time-domain Features and Neural Networks by B. Sreejith et al, 2008 IEEE Region 10 Colloquium and the Third ICIIS, India, Dec. 8-10, Paper ID#409, pp. 1-6.

UK International Search and Examination Report for International Application No. GB1221071.2 mailed on May 9, 2013, 7 pages.

Vibration Monitoring of Rolling Element Bearings, Technical Note, 01db Metravib Techonolgies, www.01db.com, 2 pages.

De Lorenzo, et al.: "Kurtosis: A Statistical Approach to Identity Defects in Rolling Bearings", Jun. 25, 2007, pp. 17-24.

PREVENTING DISTURBANCE INDUCED FAILURE IN A COMPUTER SYSTEM

CROSS REFERENCE TO RELATED APPLICATION

This application is a continuation of co-pending U.S. patent application Ser. No. 13/304906, filed Nov. 28, 2011, entitled "Preventing Disturbance Induced Failure In A Computer System," the entirety of which is hereby incorporated herein by reference.

BACKGROUND OF THE INVENTION

1. Field of the Invention

This invention relates, in general, to server computer monitoring, and in particular, to preventing failure in a server computer due to disturbance such as shock, vibration and/or seismic event.

2. Description of the Related Art

As technology advances, the complexity and number of electronic components inside computer environments has increased as has reliance on the availability of these computer environments to users. Computer downtimes or failures can cause catastrophic loss to end users. Mechanical and structural integrity of these computer environments is important to maintaining availability. Recent environmental and catastrophic events have encouraged computer system environment designers to design and implement structurally enhanced structures that can withstand sudden abnormal shock and vibration, such as those related to seismic events. A computer system may suffer data loss and system collapse which may affect lives and infrastructure. While some infrastructures may be able to withstand sudden sustained disturbance such as shock and vibration, disturbance to a computer system may occur over an extended period of time due to moving part failure within the computer environment.

Bearing failure in rotating machinery such as a blower of a server computer can induce high vibration. This vibration potentially induces failure to the other server components such as critical cards or induces connector wear. Normally, such bearing failure is a gradual degradation over time. Hence, it is desirable to introduce a solution which provides online monitoring and analyses of shock and vibration in a computer system and subsequent mediation measures. Shock to a server computer can also damage parts and cause machine failure.

SUMMARY OF THE INVENTION

According to an aspect of the invention, a method to prevent failure on a server computer due to disturbance is provided. The method includes: acquiring, by at least one sensor, analog acceleration data of components in a server computer; converting, by a computer processor, the analog acceleration data to digital form; storing the converted data within a motor drive assembly processor memory unit; analyzing the stored data for existence of machine degradation; and in response to detecting the existence of machine degradation, initiating, by the motor drive assembly processor, remediation procedures.

DETAILED DESCRIPTION OF THE PREFERRED EMBODIMENTS

An embodiment of the invention includes the integration of sensors which can detect disturbance, a processor within a motor drive assembly for digital data collection and processing, and a computer (computer system controller) for online monitoring of rotating machinery condition. The disturbance can be a shock, a vibration, a seismic event or any combination thereof. In addition, the disturbance may be internally or externally induced. The processor within the motor drive assembly can also implement remediation measures if a problem is detected. The remediation measures can include changing the rotating speed of rotating machinery rpm or other rpms to avoid resonance e.g. lowering fan speed, or more complex non trivial controls that are based on overall system functionality. Under certain conditions, such as if shock and/or vibration is detected on multiple rotating devices at once within Server Computer, a complete shut down of the entire Server can be executed to protect data loss.

The integrated system can include the following main components: Sensors—tri-axial accelerometers imbedded in motor drive of rotating machinery; data acquisition and conversion via available microprocessor and TCP/IP service network; a method of detecting failure such as Kurtosis; periodic monitoring and storing of the vibrational data; Data analysis; and in the event of a problem, executing remediation measures such as reporting/call home to a laptop or directly controlling one or more motors to prevent damage to the server computer. Multiple sensors may be used throughout the server computer to monitor more than one device. For example, several blower fans may be monitored at once. Sensors may be placed within the motor drive assemblies of the rotating machines or placed throughout the server. As described further below, a smart integrated system is provided which prevents failure on its own system due to internally or externally induced disturbance such as shock and/or vibration.

Figure 1:
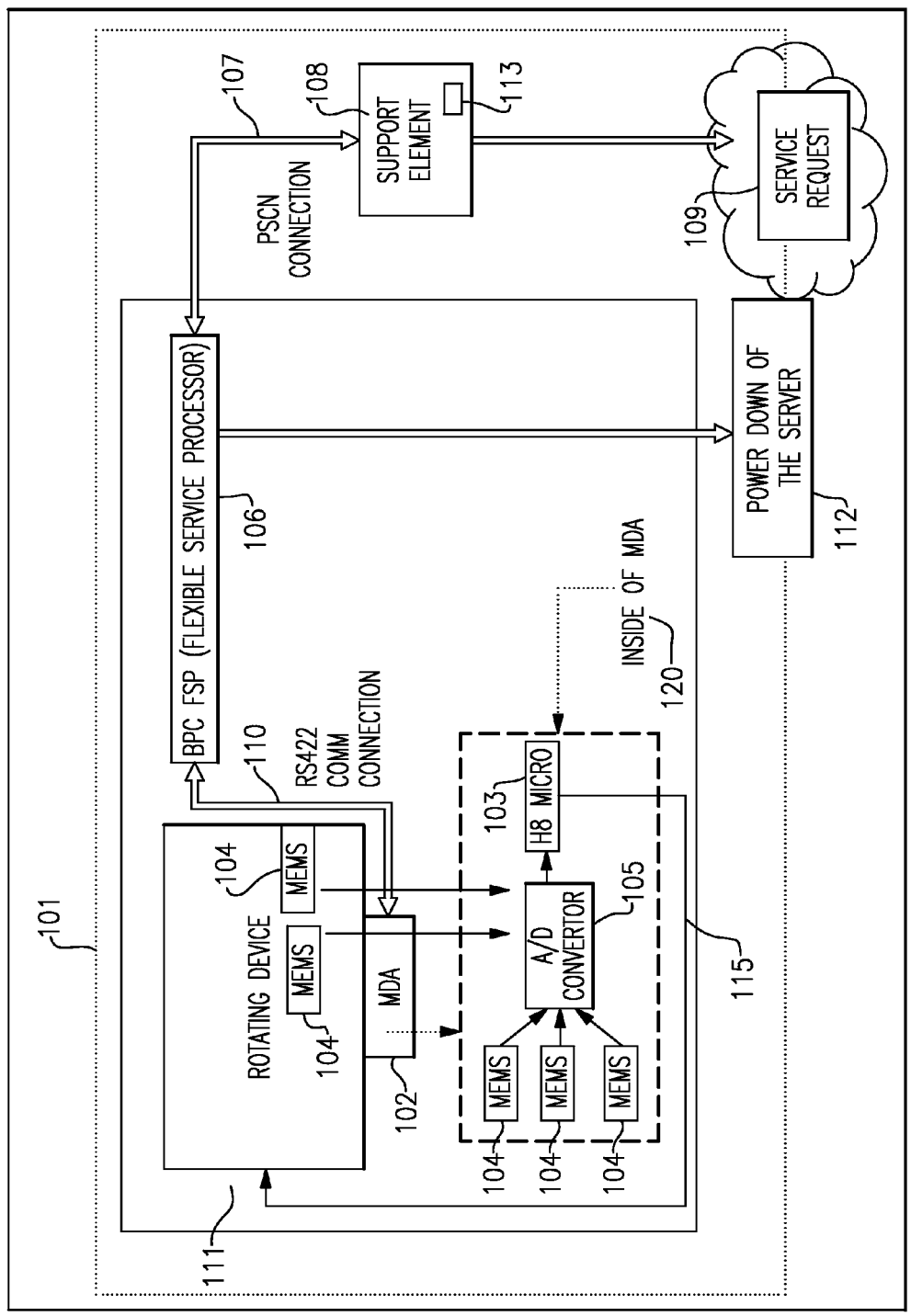
FIG. 1 depicts an integrated system according to an embodiment of the present invention.

FIG. 1 depicts an embodiment of the invention implemented in Server Computer 101. During system Power On, an Auto-Code Download (ACDL) will be initiated by a System Driver 113 within Support Element (SE) 108. Auto code download (ACDL) is source code that loads power firmware code into power hardware microchips. Support Element (SE) 108 can be a physical laptop that behaves as a control workstation for the server computer. The entire system driver is loaded on SE 108. When the system boots up the SE code that runs on the SE, the SE initiates various boot up sequences for the system. The code is loaded inside of the Bulk Power Controller H8 Micro (BPC) 106 via Power Service Control Network Connection (PSCN) 107. The PSCN is an internal service network that binds together all the large components of the server computer.

The BPC serves as a main controller for the computer server's power and cooling. The RS422 COMM connection 110 provides a bidirectional communication link between the BPC and Motor Drive Assembly (MDA) 102. MDA 102 is part of the Rotating Device Assembly 111. In this embodiment, the Rotating Device Assembly is a cage fan blower. Bulk Power Controller H8 Micro (BPC) 106 contains the Flexible Service Processor, which is part of the Service Network that controls the entire power subsystem and controls the RPM of the rotating device. BPC 106 may also initiate a complete power down 112 of the server. A logic power off (gentle shutdown) may also be performed which stops data transactions to avoid data loss while the machine remains powered on. FIG. 120 shows the details of the Motor Drive Assembly. Support Element 108 loads code into BPC 106. BPC 106 then loads code into the MDA 102 using the RS422 connection as indicated n 10. More specifically, code is loaded into H8 Micro 103 which resides inside of the MDA 102.

While system operates, the code inside of the MDA controls blower operations and performs sensor data collection/analysis through the use of Microelectomechanical systems (MEMS) sensors 104. The MEMS used in this embodiment are tri-axial accelerometers; however other types of sensors for capturing acceleration data may be used. The MEMS 104 may be placed anywhere in or on the server computer. In the embodiment, MEMS 104 are placed on the rotating device and inside the MDA itself. MEMS collects data in analog form, and A/D converter 105 performs analog to digital conversion on the data. The digital data is then passed to H8 Micro 103 which performs analyses for machinery failure. The code inside of H8 Microchip 103 will determine if a particular blower needs to be shutdown, slowed down, or speeded up based on sensor data analysis using procedures discussed later. 115 shows the H8 Micro inside the MDA 102 controlling such a shutdown or speed control.

MDA 102 also communicates back to the Support Element Support Log 113 via the existing communication paths, using the RS422 connection 110 to reach the BPC 106 and then utilizing the PSCN connection 107 to reach Support Element 108. Using a Reference Code structure in the Support Element (SE) 108 driver, SE code will also be able to initiate a Service Request 109 to report various failure conditions for repair and verify actions. The Service request can take the form of an email or pager notification. The sensors can detect internally induced rotating machinery bearing failure or externally induced shock and vibration.

Different methods exist for monitoring machinery degradation by analyzing acceleration responses of machinery. Such methods include periodic monitoring and comparing the peak acceleration data versus the peak of a "known good" component acceleration; periodic monitoring and comparing the FFT (Fast Fourier Transform) acceleration data vs. the FFT of "known good" component acceleration; and periodic monitoring and comparing the Kurtosis of acceleration data. A high kurtosis distribution has a sharper peak and longer, fatter tails, while a low kurtosis distribution has a more rounded peak and shorter thinner tails. Use of Kurtosis in statistical analysis is known in the art.

Figure 2:
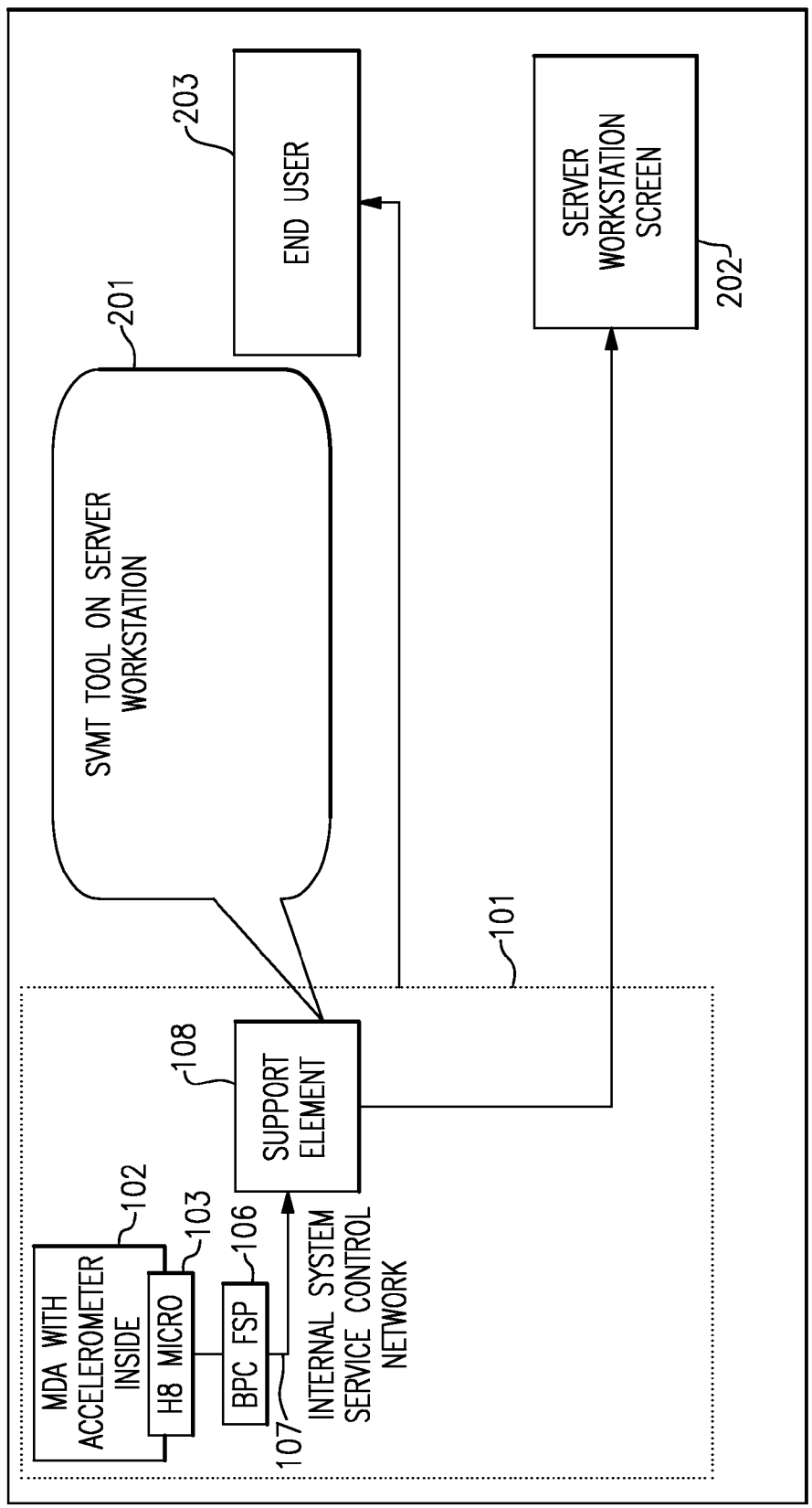
FIG. 2 depicts an embodiment of the Shake & Vibration Monitoring Tool.

In an embodiment of the invention, a command line tool (such as SVMT: Shake & Vibration Monitoring Tool) running on the server workstation allows a user to monitor data from various sensors placed within and around the computer system environment. The SVMT tool acquires this data through a Service Microprocessor inside the MDA using the Internal Service Control Network of the system. FIG. 2 shows such an implementation of the Shake & Vibration Monitoring Tool (SVMT) command line tool. As discussed earlier, Server computer 101 contains the Motor Drive Assembly (MDA) 102. The MDA contains H8 Microprocessor 103 and a MEMS Accelerometer Sensor. The MDA is in communication with Bulk Power Controller (BPC) 106. Data is transmitted from the MDA 102 to BPC 106. The data then passes to Support Element 108 though the internal Power System Service Control Network PSCN 107. In this embodiment Support element 108 is running the command line tool Shake & Vibration Monitoring Tool (SVMT) 201. The SVMT allows system users to query vibrational data and display it live on the server workstation screen 202 with some set time intervals. Live sensor data can be displayed on the SE screen via the SVMT Tool or can be displayed using System Log. The tool will allow logging of the data and transmission of the data to the end user 203 via a specified email account for further analysis. Logged Sensor Data can be stored locally on the SE memory and/or sent via specified email. Sensor Data can also be stored in the System Log.

Additional features of the tool can include granting a user the ability to execute various commands to pull live data on the screen to effectively provide on-demand monitoring. Users can further enter contact information such as email addresses or phone numbers to receive emergency notifications and users may also set up a schedule (time intervals for data query and data collection) to have data pulled off the system and sent (using SMTP: Simple Mail Transfer Protocol) to his/her email address.

Logged data files can be formatted using the CSV format and Shock and Vibration Sensor data can become part of the Power Thermal Code Subsystem in the main system log. In addition, the Internal System Power Code can also analyze vibrational data and control Rotating machinery by changing the rotating speed to avoid resonance and prevent component failure such as when the kurtosis value changes significantly or the amplitude of the acceleration doubles the initial values. When, for example, bearing failure or other abnormal condition is detected, the motor controller can change the rotating speed of rotating machinery rpm to avoid resonance and prevent failures in the field.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of the invention and the practical application, and to enable others of ordinary skill in the art to understand the invention through various embodiments and the various modifications thereto which are dependent on the particular use contemplated.

We claim:

1. A method to prevent failure on a server computer, comprising:
   acquiring, by at least one of a plurality of sensors, analog acceleration data of at least one component in the server computer;
   converting, by a motor drive assembly, the analog acceleration data to digital acceleration data, the at least one component being controlled by and connected to the motor drive assembly;
   analyzing, by the motor drive assembly, the digital acceleration data to detect an existence of performance degradation; and
   in response to detecting the existence of the performance degradation, performing, by the motor drive assembly, at least one of a plurality of remediation procedures.

2. The method of claim 1, wherein the at least one of the plurality of sensors comprise a tri-axial accelerometer imbedded in the motor drive assembly of rotating components within the server computer.

3. The method of claim 1, wherein the performing of the at least one of the plurality of remediation procedures comprises selecting at least one procedure based on a periodic comparison from a group comprising a shutdown procedure, a slowdown procedure, a speedup procedure, a shutoff procedure, and a sending procedure,
   wherein the shutdown procedure causes a shutdown of the server computer; and
   wherein the slowdown procedure causes a slowdown of at least one of a plurality of moving components of the server computer;
   wherein the speedup procedure causes a speed up of the at least one of the plurality of moving components;
   wherein the shutoff procedure causes a shut off of the at least one of the plurality of moving components; and
   wherein the sending procedure causes a sending of a machine status notification to a recipient.

4. The method of claim 1, wherein the existence of the performance degradation relates to a shock disturbance.

5. The method of claim 1, wherein the existence of the performance degradation relates to a vibration disturbance.

6. The method of claim 1, wherein the existence of the performance degradation relates to a seismic event disturbance.

7. The method of claim 1, further comprising:
   enabling, by a shake and monitoring vibration tool, a query of the digital acceleration data for vibrational data, the motor drive assembly being connected to the shake and monitoring vibration tool of a support element of the server computer; and
   causing, by the shake and monitoring vibration tool, a response to the query to be logged for further analysis, the response including set time intervals.

8. The method of claim 1, wherein the analyzing, by the motor drive assembly, the digital acceleration to detect the existence of the performance degradation comprises:
   analyzing the digital acceleration data in a frequency domain of a fast Fourier transform by utilizing a periodic comparison between the digital acceleration data and a known operation condition to detect the existence of the performance degradation.

9. The method of claim 1, wherein the plurality of remediation procedures being applied to the at least one component based on a periodic comparison.

* * * * *